June 23, 1964

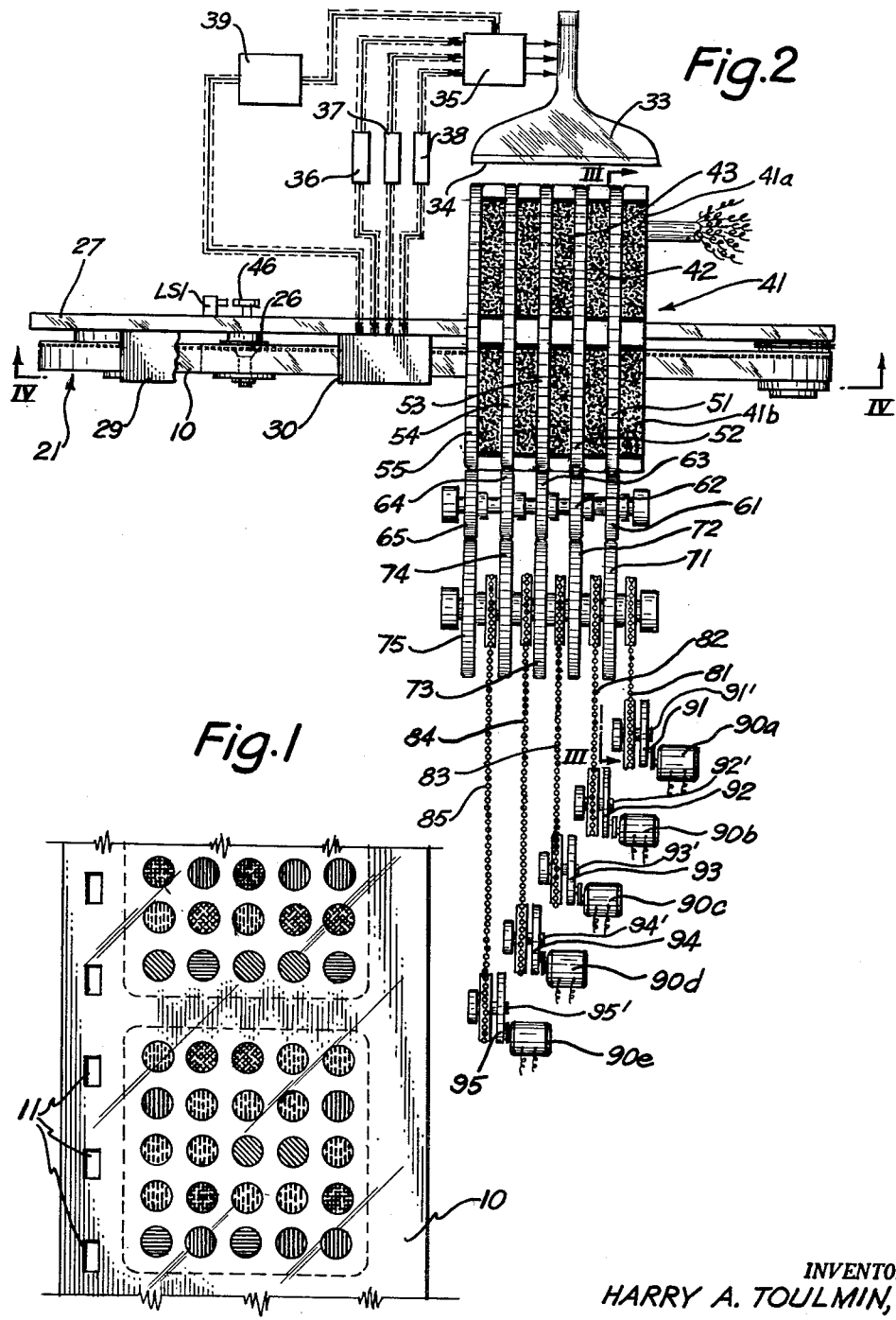

H. A. TOULMIN, JR 3,138,783

ARRANGEMENT FOR READING OUT SYMBOLICALLY RECORDED INFORMATION IN COLOR

Filed Jan. 18, 1961

INVENTOR.
HARRY A. TOULMIN, JR.
BY Toulmin & Toulmin
Attorneys

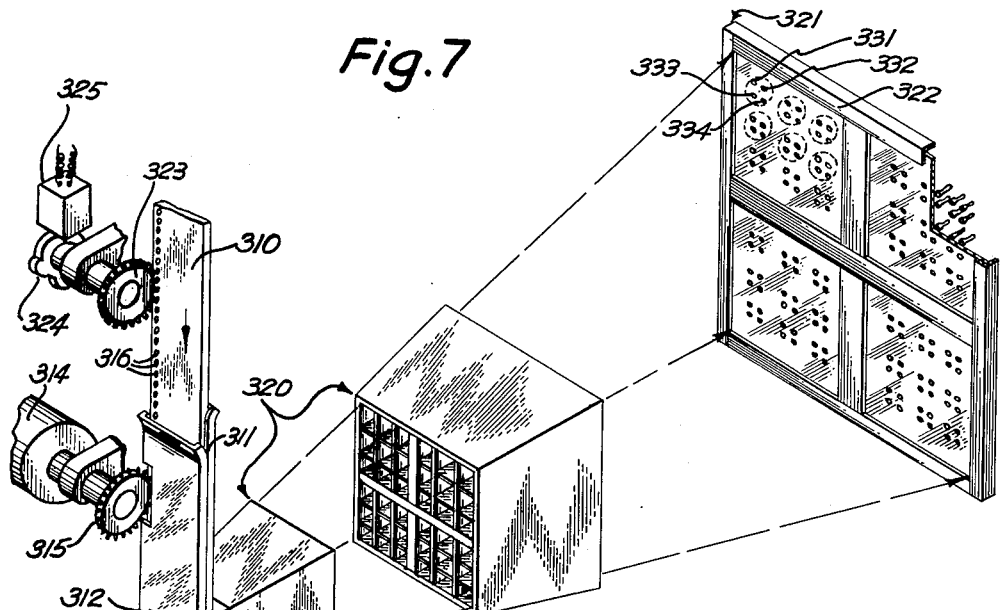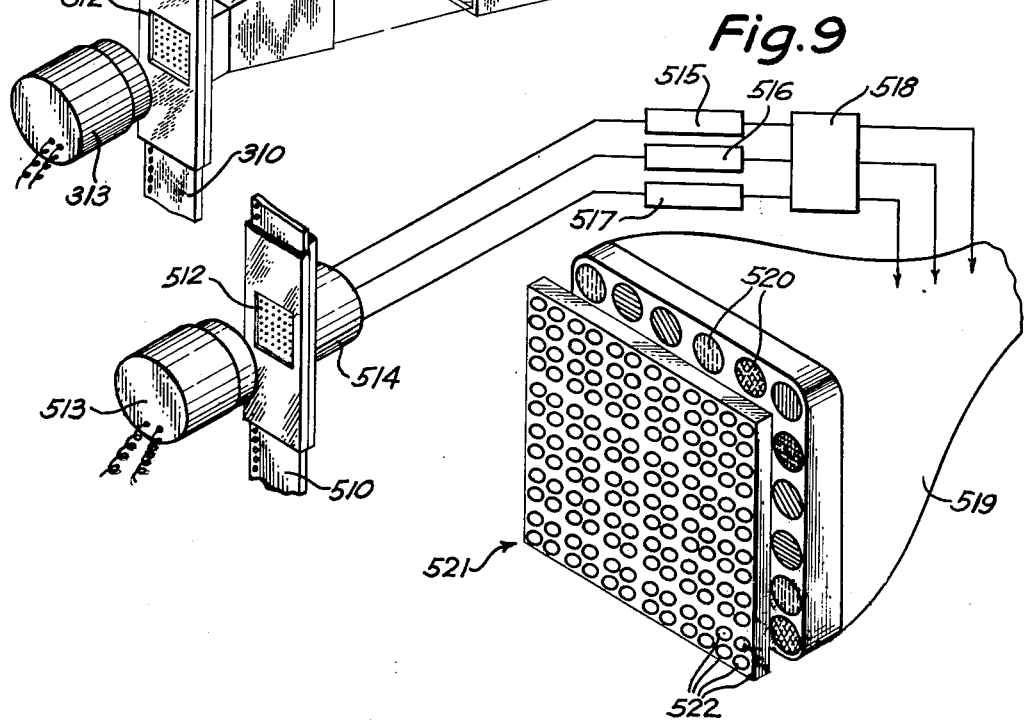

June 23, 1964
H. A. TOULMIN, JR
ARRANGEMENT FOR READING OUT SYMBOLICALLY
RECORDED INFORMATION IN COLOR
3,138,783
Filed Jan. 18, 1961
7 Sheets-Sheet 6
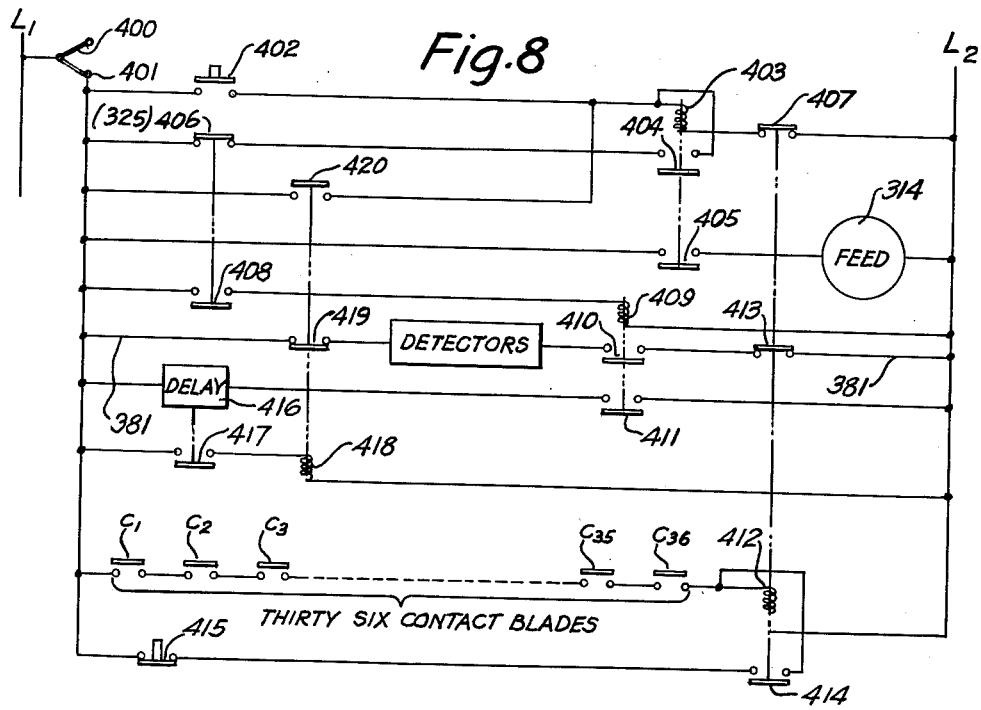
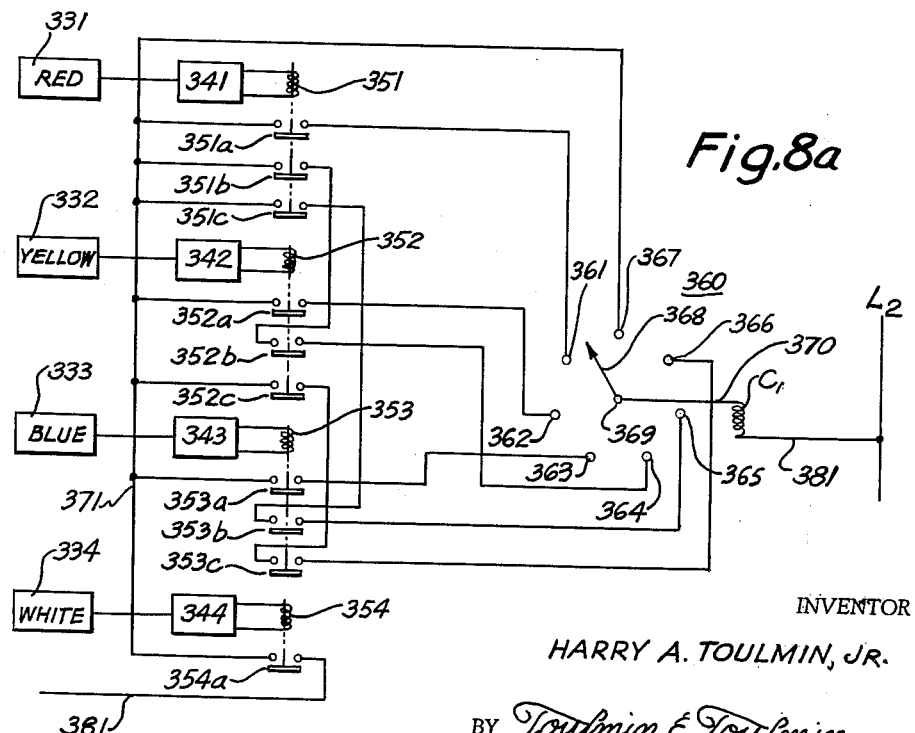
INVENTOR
HARRY A. TOULMIN, JR.
BY Toulmin & Toulmin
ATTORNEYS

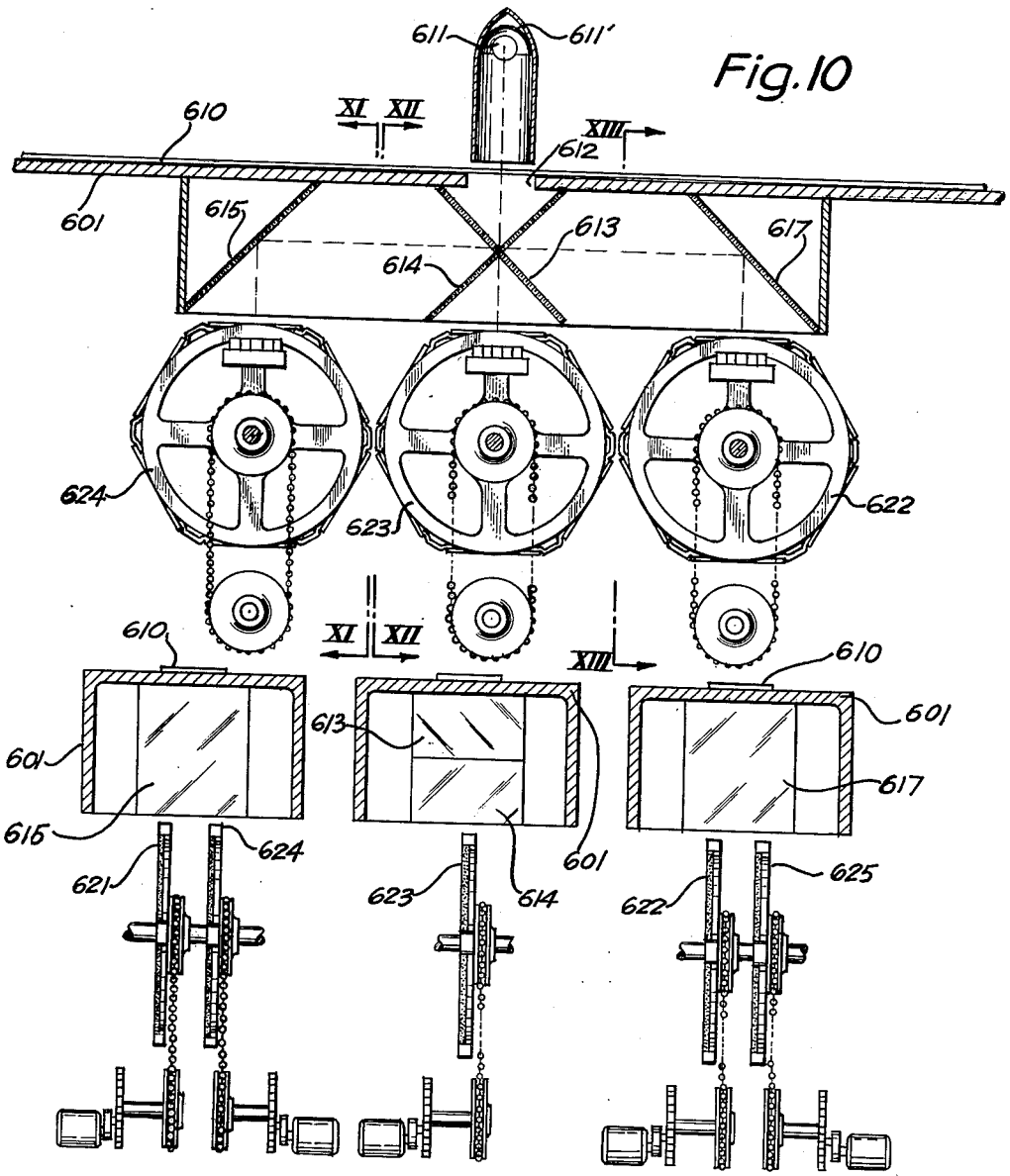

United States Patent Office 3,138,783
Patented June 23, 1964

3,138,783
ARRANGEMENT FOR READING OUT SYMBOLICALLY RECORDED INFORMATION IN COLOR
Harry A. Toulmin, Jr., Dayton, Ohio, assignor to The Commonwealth Engineering Company of Ohio, Dayton, Ohio
Filed Jan. 18, 1961, Ser. No. 83,567
7 Claims. (Cl. 340—173)

The present invention is related to an arrangement for reading out symbolically recorded information stored on an information carrier, whereby the intelligence information is recorded in an area of such carrier defined by a predetermined pattern of spatially separated colored dots selected from a number of preselected colors.

It is a primary object of the present invention to provide a read out device for information being given as a combination of colored dots, and being located in very small areas. It is another object of the present invention to provide new and improved apparatus for the scanning or probing and reading of colored dot combination patterns stored in large number on a relatively small carrier.

According to one aspect of the present invention in a preferred embodiment thereof, it is suggested to first provide illuminating means for a limited region of the storage carrier; furthermore means are provided for optically enlarging this area available for probing or detecting the information pattern; the probing of the enlarged areas is carried out by radiation sensitive detector means feeding their responsive signals into a coincidence network whereby outputs are produced corresponding to coincidence or non-coincidence of the observed colored dot pattern and a predetermined combination of colored dots.

According to another aspect of the present invention, it is suggested to probe each dot or an image thereof with regard to its color and to compare electrically the result of such probing with a predetermined color setting for this dot. This specification will primarily include the description of scanning stations for films as carrier for information by colored dot patterns. However, it is understood that all kinds of webs, or single cards, can be used as carriers.

While the specification concludes with claims particularly pointing out and distinctly claiming the subject matter which is regarded as the invention, it is believed that the invention, the object of the invention, and further objects and advantages thereof will be better understood from the following description taken in connection with the accompanying drawings in which:

FIGURE 1 is a top view of a portion of a storage carrier for color dot patterns used according to an example of the present invention;

FIGURE 2 is a top view, including a schematic circuit diagram, for a read-out station observing the storage carrier of the type illustrated in FIGURE 1;

FIGURE 7 is a perspective view of another embodiment of the present invention;

FIGURE 8 illustrates an electric circuit diagram employed to provide a coincidence circuit network associated with the embodiment of the invention shown in FIGURE 7;

FIGURE 8a illustrates a circuit diagram of a part of the electrical probing device used in FIGURE 7;

FIGURE 9 illustrates in perspective view another embodiment of the present invention including a schematic circuit diagram;

FIGURE 10 illustrates a cross-section through another embodiment of the present invention;

FIGURE 11 is a cross-sectional view along the line XI—XI in FIGURE 10;

FIGURE 12 is a cross-sectional view along the line XII—XII of FIGURE 10; and

FIGURE 13 is a cross-sectional view along the line XIII—XIII in FIGURE 10.

Figure 3:
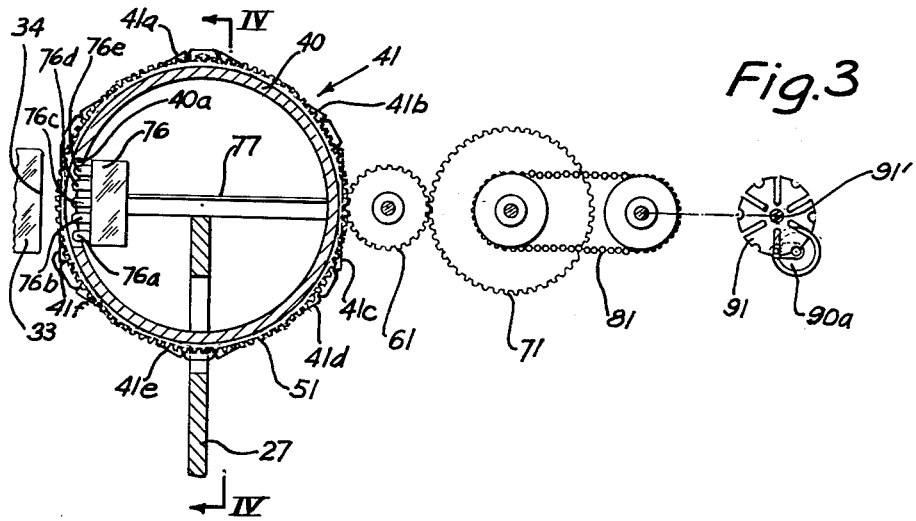
FIGURE 3 is a cross-sectional view along the line III—III of FIGURE 2.

Turning now to the detailed description of the drawings there is shown in FIGURE 1 a portion of a preferably transparent film strip 10 which is used as the information carrier or the information storage means. This film 10 has the usual perforations 11 for proper transportation thereof. These perforations 11 are accurately spaced from each other and have a predetermined spatial relationship to an area upon which is stored intelligence information. This area is defined by a pattern of informative dots and it is indicated by the dashed line forming a square. Within this square are provided 5×5, i.e., 25 dots. These dots are spaced from each other in a preferably equi-distance relationship between neighboring dots, and they are arranged in five columns and five lines. Each dot is a pre-selected one of a number of colors. The number of colors is limited only by the extent of their electronic detectability. In other words, the number of colors from which each dot is to be selected is given by the number of colors which can be distinguished by electronic detecting means employing either color selective photocells or photocells each having a pre-cell filter, or a combination thereof. At the present time it is possible to distinguish electronically up to among fifteen colors. Thus, in the area as illustrated in FIGURE 1 on tape 10 having twenty-five dots, $15^{25}$ different intelligence information can be stored therein. This is a number of the 29th order of magnitude; in other words, there are conceivably $10^{29}$ different color dot patterns. Suppose each information were placed within a square of one centimeter length, one adjoining the next one, and suppose one would intend to place all possible information patterns on one film, this film would have a length which is about one million times larger than the distance to the next galaxy, the andromeda nebula. It is therefore apparent that for all practical purposes it can readily be said that the number of information which can possibly be encoded by such patterns of color dot combinations is unlimited.

It is therefore also apparent that for all practical purposes one does not have to go to the limit of electronic color distinguishability, but one may use quite a lesser number of colors from which each dot will be selected and one would still have available an almost inexhaustable number dot combinations. If one uses, for example, only six colors such as red, orange, yellow, green, blue and violet or purple, the possibilities for information is $6^{25}$ which is still a figure of a 19th order of magnitude.

For the purposes of explaining the present invention, I shall consider only these six colors, but, of course, it is understood that this is an arbitrary limit, and it does in no way limit the possible number of colors for the instant invention Also, the number of dots to be employed to form one pattern can also be selected arbitrarily and is limited only by the available space on the carrier slotted to one information.

It has to be mentioned that complete "white" or complete "black" or "no color" can also be included as a possible color; however, for purposes of explaining the invention no use shall be made thereof, because in view of the large number of informations storable with real colors, the presence of dots being completely white or completely black can actually be used better for control purposes; this will become more apparent later in this specification.

Figure 4:
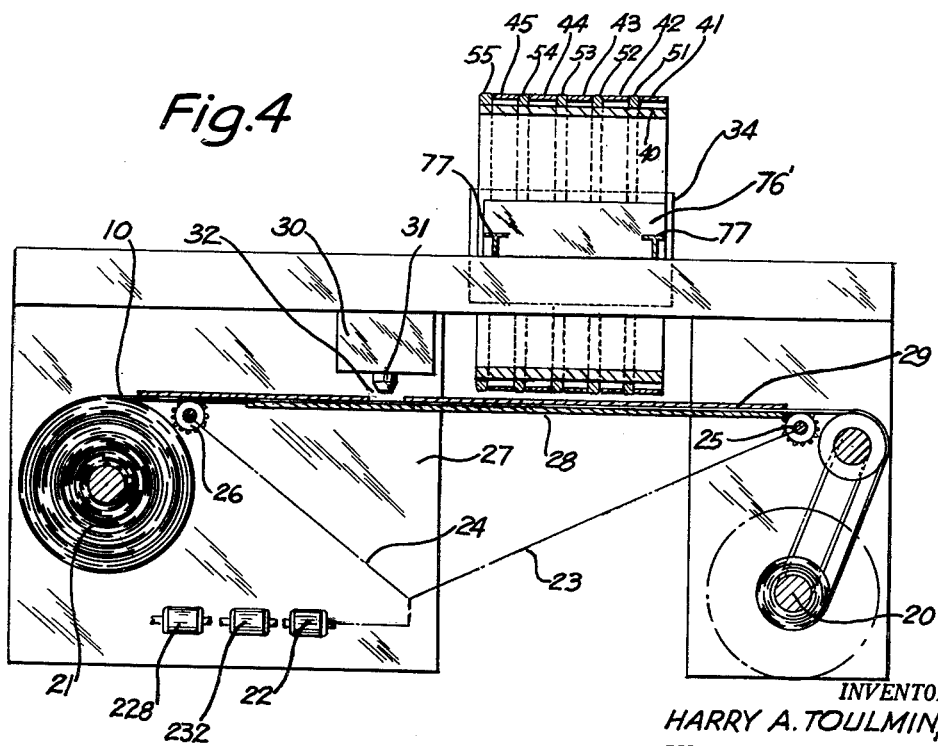
FIGURE 4 is a partial elevated view, partial cross-sectional view along the line IV—IV of FIGURE 2, thus illustrating a different view of the same embodiment of the present invention.

Turning now to the structure illustrated in FIGURES 2, 3, and 4, there is first again visible the film 10 which is to be wound upon a spool or reel 20 after having been unwound from a spool or reel 21. There is provided a driving motor 22 rotating drivingly shafts 23 and 24. These shafts 23 and 24 drive tooth wheels 25 and 26, respectively, engaging the perforations 11 of film 10. There is a further provided stationary support 27. Between the two transporting tooth wheels 25 and 26 there is provided a flat base plate 28 over which the film 10 is guided, being prevented from any deflection perpendicular to plate 28 by a plate 29, having a window 32.

There is a tri-color television camera 30 with an optic 31 mounted on support 27, whereby the optic 31 is directed towards that portion of film 10 visibly appearing in the window 32 of plate 29. This television camera 30 has preferably a single channel optic, such as objective 31, but optical color selective means are provided in the light ray pass of the optic, defining three separate color channels in the camera, for the usual three basic colors—red, yellow, and blue, used in color television. Cameras of this type are known very well and no further explanation thereof is needed. Film 10 in window 32 may be illuminated if the ambient illumination is insufficient.

There are provided five turrets, 41, 42, 43, 44 and 45, rotatably mounted on a sleeve 40 having a window 40a and being secured to the support structure 27. The five turrets 41 to 45 are rotatable separately, and they are integral with ring gears 51, 52, 53, 54 and 55, respectively, gearing with drive gears 61, 62, 63, 64 and 65, respectively; the latter gearing in turn will gear the drives 71, 72, 73, 74 and 75, respectively. Gear drives 71 to 75 are driven, separately, by chains 81, 82, 83, 84 and 85, respectively. Each chain, 81 to 85 is geared to a geneva drive 91, 92, 93, 94 and 95, respectively, which in turn are driven by motors 90a, 90b, 90c, 90d, and 90e. Numerals 91', 92', 93', 94', and 95' denote the rotatable shafts of the geneva drives, respectively.

Turrets 41 to 45 include ring gears 51 to 55, respectively, as well as a plurality of filters. Each turret has altogether six filters representing the six different colors as used for the dots on film 10. These filters are shown completely only for the turret 41 in FIGURE 3, and they are designated by 41a to 41f.

Looking particularly at the turret driving arrangement illustrated in FIGURE 3 for turret 41, the motor 90a is continuously running, thereby moving the geneva drive 91 in a step-wise manner which step-wise movement is transmitted to turret 41 via the gearing transmission 81, 71, 61 and 51. The ratio of these driving gears is determined so that with one step of each geneva wheel leaf, the turret is moved by 60°.

Inside of turret 41 is disposed a bank of five photocells, 76a, 76b, 76c, 76d and 76e. These photocells are placed adjacent the nearest filter of turret 41. The bank of photocells denoted with reference numeral 76 is supported by a bar 77 mounted on an upstanding portion of the support 27.

It will be appreciated that there are altogether five of such banks of photocells, each bank being stationarily disposed in one turret; each photocell bank is positioned so as to face one filter plate of each turret. Preferably all the photocells together define one common optical-electrical-output-input plane.

There is furthermore provided a television picture tube 33 having the usual video screen 34 which faces the turrets, particularly those filter plates thereof which are momentarily placed adjacent the banks of photocells. Thus, the photocells observe the picture tube 33 through the turret filters, whereby each photocell observes a limited portion of screen 34.

The television picture screen 34 and the photocells are positioned so close to the filters that the screen can be considered as being divided virtually into five columns and that each bank of photocells of one turret observes one of such columns. In view of the interpositioning of filters between screen 34 and photocells, each column is observed monochromatically. However, when the turrets are rotated, whereby different filters are placed between the television picture and the photocells, the particular color of the monochromatic picture column detected by one bank of photocells varies. Inasmuch as the camera 30 observes columns of dots and is connected to tube 33, corresponding columns of dot images appear on screen 34. It will be apparent that each bank of photocells observes one column of dot images, and each photocell in one bank observes the reproduced picture of one dot.

As indicated schematically in FIGURE 2 there is furthermore provided a control circuit 35 for the television picture tube 33. This television picture tube is suitable for the reproduction of color pictures. In particular, this tube 33 may have the presently common trichromatic mosaic video screen, and it further has three separately controlled electron guns in its neck portion.

These three electron guns, i.e., the flows of electrons therefrom, are controlled separately by three transmission channels generally designated with reference numerals 36, 37 and 38. These three control or transmission channels 36, 37 and 38 transmit separately the red, green and yellow video signals coming from the tri-color camera 30.

In view of the fact that the television camera-television receiver arrangement is interconnected directly by cable without necessitating any broadcasting, the transmission of the three separate color components as detected by the camera 30 does not require many of the elements usually necessary for color TV. Each channel is properly shielded and no carrier wave and modulating is required, and there does not exist any tuning problem. The color channels can be kept separately by cable transmission, and one does not have to provide for a separate transmission of luminance and chrominance components.

Inasmuch as there is no wireless transmission involved, one also needs only one synch pulse generator (39), controlling the synchronization of the scanning in the camera as well as in the receiver tube. The stationary device for synch pulse generator and local oscillator is schematically indicated by the block denoted with reference numeral 39. The synch pulse generator 39 is connected to both the receiver and the camera accordingly.

It is apparent that conventional components known in the art of television and particularly for color television can be employed here without any difficulty whereby the entire arrangement is considerably simpler than the usual color television broadcasting system, and only the principal elements thereof as outlined are to be employed.

From the arrangement as described in connection with FIGURES 2, 3, and 4, it will be apparent that the film 10 is wound from a spool 21 and on a spool 20 and thereby it passes under television camera 30. The colored dots on the film are monitored and observed by this camera 30 and corresponding electric signals are transmitted to the reproducing or receiver tube 33 whereby on screen 34 a considerably enlarged picture appears of the dots on the film 10 as momentarily observed by the camera.

It will become more apparent later in this specification, that the film 10 is moved in steps so that the scanning of each area on film 10 is carried out while the film stands, thus, the scanning rate in the television transmission arrangement can be a very slow one, for example, one picture per second; therefore no separate light source is needed to illuminate the film. The picture of the dot pattern on screen 34 being observed by the photocells may not only be enlarged in scale, i.e., in size, but it also can be amplified as far as detectable brightness for the photocells is concerned, in comparison with the dot pattern observed by the camera 30.

There is furthermore stationarily mounted on support 27, a limit switch LS1 cooperating with a tooth wheel 46 which is geared to or, preferably, mounted on the same shaft as, for example, transport gear 26. This tooth wheel 46 actuates in steps the limit switch LS1. It will also become more apparent later in this specification that the actuation of limit switch LS1 is carried out every time an area of film 10 including one complete pattern of dots, is placed under the objective 31 of camera 30. Then the film stops and the TV arrangement produces a still image of the dot pattern on screen 34 to be observed by the photocells, whereby each photocell observes one dot.

It will be appreciated that a tensioning device may permanently bias winding spool 20, thus keeping film 10 stretched at all times, whereby this film is transported for movement directly only by motor 22. Motors 228 and 232 may also drive shafts 23 and 24 and will be referred to in connection with FIGURE 6.

Figure 5:
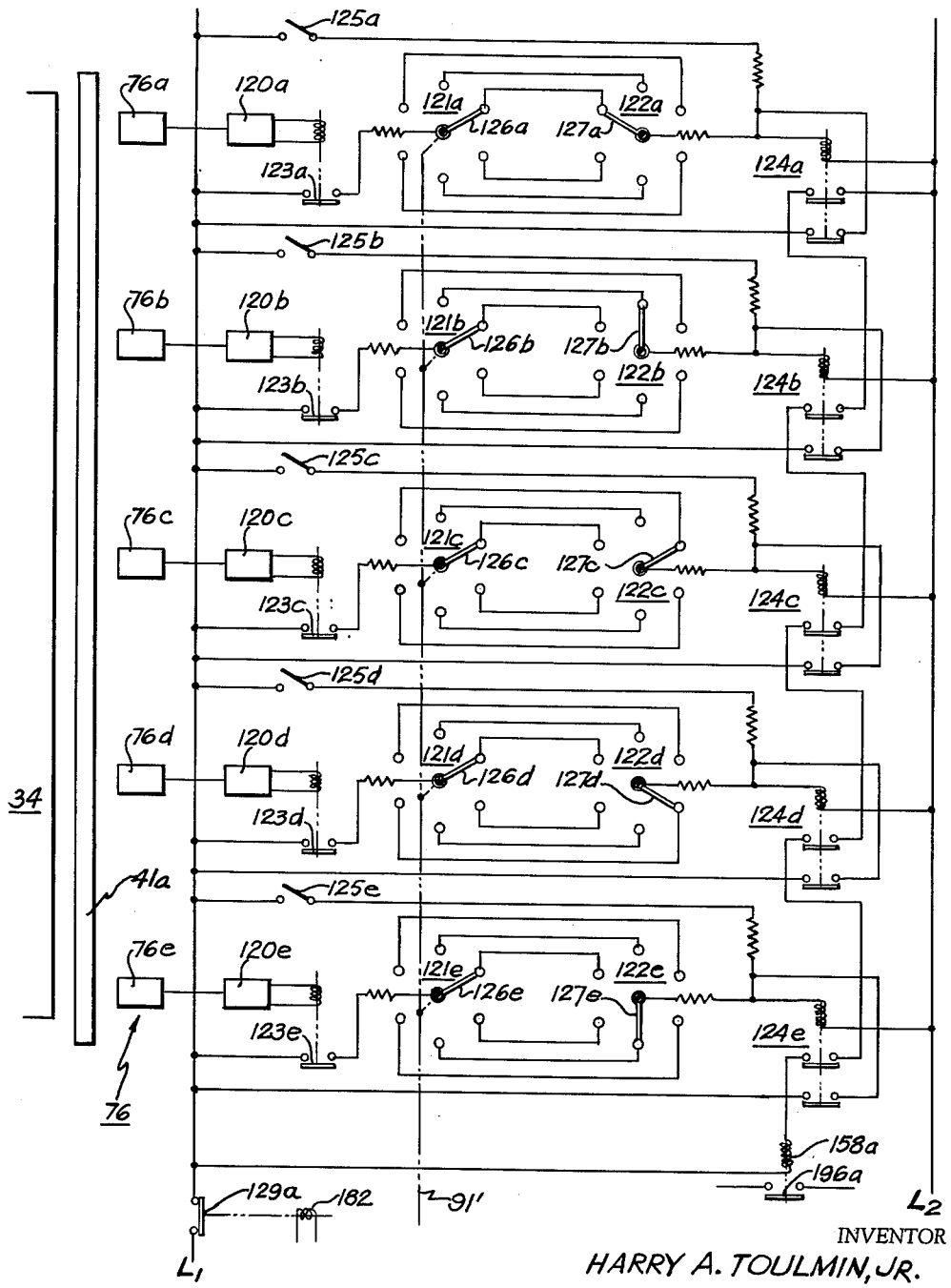
FIGURE 5 is a circuit diagram of a portion of the read-out device as employed in the embodiment illustrated in FIGURES 2, 3, and 4, including one portion of a coincidence network.

Turning now to FIGURE 5 there is illustrated the immediate output circuit network of the bank of photocells 76. The photocells 76a and 76e observe a portion of a video screen 34 through any of the filters such as 41a of turret 41. In particular, these photocells observe the images reproduced on screen 34 of one column of images of colored dots, as stated above. Each photocell defines the optical-electrical input circuit for one dot detecting channel.

There are provided 5 photo-electric amplifiers denominated with numerals 120a, 120b, 120c and 120d and 120e, one each for every photocell. These amplifiers control relays, one each, having blades 123a, 123b, 123c, 123d and 123e, respectively. It will be apparent that these relays are normally in the position as illustrated when the associated photocells are not energized. In case of energization thereof, the relay blades will assume the upward position. L$_1$ and L$_2$ denote power lines of opposite polarity for providing the necessary electric current for the circuit network illustrated in FIGURE 5.

There is furthermore provided a plurality of rotary switches denoted with reference numerals 121a, 121b, 121c, 121d and 121e. Each one of these rotary switches has a movable contact arm 126a, 126b, 126c, 126d and 126e, respectively. All these contact arms are mounted on a common shaft denoted with reference numeral 91' whereby this shaft rotates with the geneva wheel 91 as illustrated in FIGURES 2 and 3.

Each one of these rotary switches has six stationary contacts which are circularly arranged, and it will be understood that for each step of rotation of the geneva wheel 91 all the contact arms will move from engaging one stationary contact, respectively, to engaging the next one, respectively.

Each contact arm is electrically connected to the operating contact of the photo-electrically controlled relay blades 123a to 123e, respectively, via a resistor, one each. It will be observed that to each position of the contact arms there is associated one particular filter of turret 41 which then is directly in front of the photocells 76. Thus, when all the rotary arms 126 to 126e move from one position to another, the next filter of turret 41 will be inter-positioned between the bank of photocells 76 and the probed columns of dot images of screen 34.

There are furthermore provided five selector switches, 122a, 122b, 122c, 122d and 122e, each having also six circumferentially disposed contacts which are connected to associated stationary contacts of the rotary switches 121a to 121e, respectively. Each one of the selector switches 122a to 122e has a rotatable adjustment arm 127a, 127b, 127c, 127d and 127e, respectively. These arms are connected to the coils of relays 124a, 124b, 124c, 124d and 124d, respectively, via separate resistances.

Each of the relays 124a to 124e has a normally open operating blade, the associated contacts thereof being all connected in series and also connected in series circuit connection with the actuator coil of a relay 158a. Thus, relay 158a becomes energized when all relays 124a to 124e are energized and their blades are closed. Each one of the relays 124a to 124e has furthermore a holding contact. Finally, the coils of each of the relays 124a to 124e may be energized via a separate circuit branch line, each one having inserted a switch which switches are denoted with reference numerals 125a, 125b, 125c, 125d and 125e.

Accordingly, the color detector arrangement for the image of any one dot on screen 34 comprises a channel which includes: a photocell with a amplifier controlling a relay; a rotary switch moving in synchronism with the turret filter for the column to which this dot pertains, a selector switch connected to the rotary switch and having an adjustable arm which is connected to a relay operating upon a blade which is connectable in series circuit connection with the corresponding blades of the relays pertaining to the detector channels for the other dot images of the same column. Dot, filter, photocell and rotary switch thus produce a certain output which is matched against the position of the selector switch; the common output thereof, being the output of this detector channel is then placed into coincidence-comparison with the corresponding outputs of the other detector channels. Finally, each of the detector channels is completed by a switch-operated line for energizing the output relay thereof independent of the selector switch and rotary switch arrangement.

Considering, for example, the detector channel to which photocell 76a pertains. Upon closing of relay 123a, a current path for relay 124a is only completed at the position of the rotary switch arm 126a as illustrated, if arm 127a has a corresponding symmetrical position. At the position of arm 126a, a particular filter is in front of photocell 76a, which filter is associated with the contacted stationary terminal of switch 121a. The symmetrical position of arm 127a completing a circuit for relay 124a also corresponds to this particular filter.

The energization of relay 123a is only possible if the dot observed by photocell 76a has the same color as the filter because only then light is permitted to pass therethrough to energize photocell 76a. The adjustment of selector switch 122a and particularly the arm 127a thereof corresponds to the selection of a particular color, or more precisely, to the selection of a particular filter; if the dot has a color corresponding to this filter, the relay 124a may be energized.

Whenever a different filter is in front of photocell 76a the two switches 121a and 122a are electrically disconnected.

Whenever the dot observed or probed by photocell 76a has a color different from the one selected by switch 122a, the energization of relay 123a occurs at a time when the two switches 121a and 122a are electrically disengaged.

The four other detector channels illustrated operate in a similar way. All relays 124a to 124e will be closed only if the adjustments made with the selector switches 122a to 122e correspond to the particular color dot combination of the column observed by photocell bank 76. If this is the case, a current path is defined for the relay 158a closing its blade 196a.

Whenever one of the button switches 125a to 125e is closed, the associated relay of the group of relays 124a to 124e, will be energized and closed regardless what the associated photocell observes and regardless of the position of the rotary switch, and of the selector switch. It is therefore apparent that these button switches 125a to 125e serve for a pre-energization of the associated relays so that coincidence or read-out is observed not only at a particular color dot combination, but for a class of combinations in which the particular color of one or more of the dots is unimportant and disregarded.

In view of the fact that there are altogether five banks of photocells in this embodiment of the invention illustrated in FIGURES 2, 3 and 4, it will be apparent that there exist four other circuit networks such as shown in FIGURE 5, each one having an output relay such as 158a to be closed whenever complete coincidence or read-out occurs in the particular column the associated bank of photocells is observing.

In FIGURE 5 is furthermore shown a contact blade 129a which opens whenever a read-out has been completed. The actuation of this contact blade 129a will be mentioned again with reference to FIGURE 6.

Figure 6:
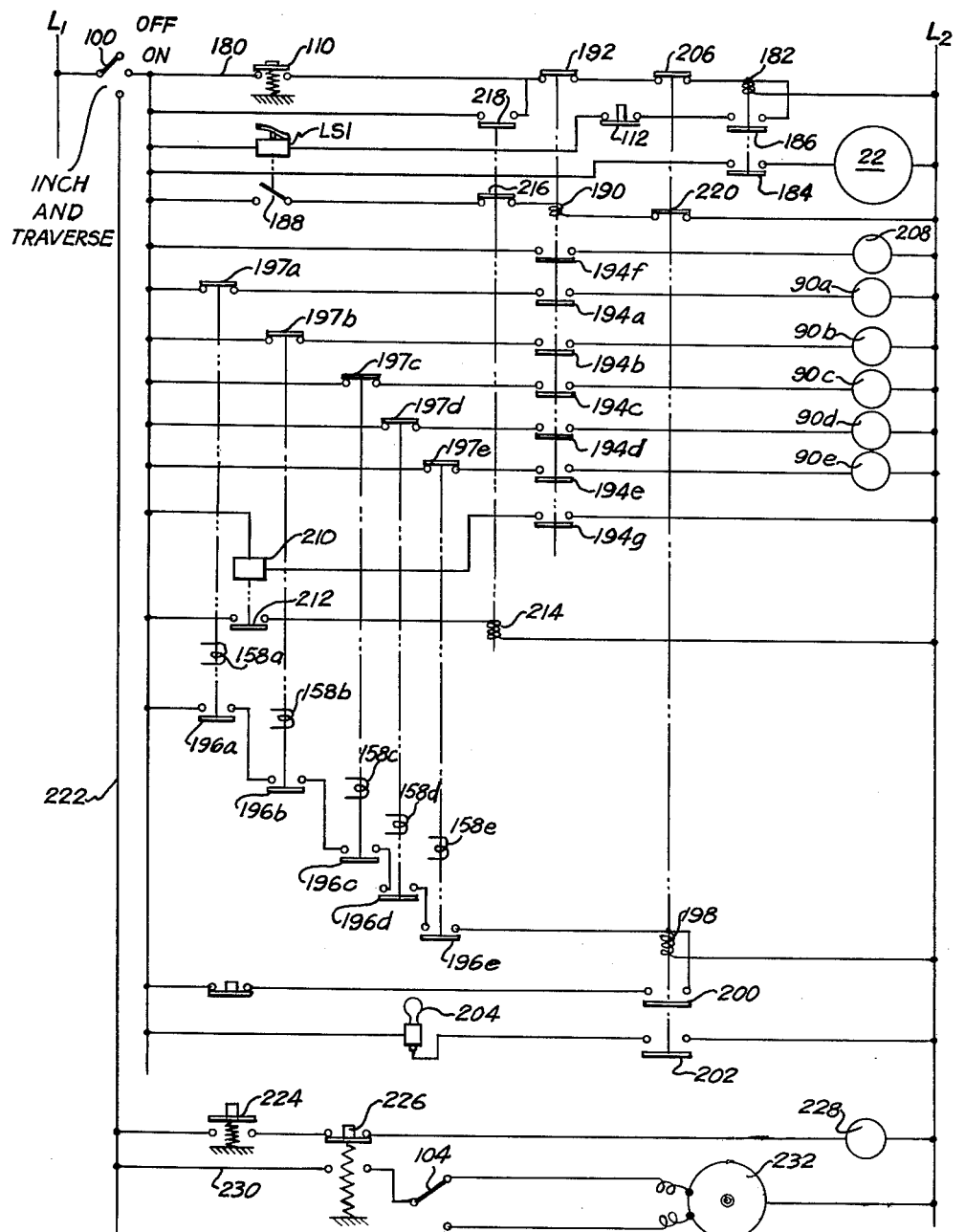
FIGURE 6 illustrates a circuit diagram for a supplementary coincidence circuit for a plurality of networks such as shown in FIGURE 5, including a schematic diagram for the electric circuit of various driving mechanisms employed in the embodiment shown in FIGURES 2, 3, and 4.

Turning now to FIGURE 6 there is shown how the read-out for a particular pattern as defined by five columns of colored dots is completed, whereby additional circuit elements are featured for an automatic stop and restart of the film 10.

In FIGURE 6, the power lines are again indicated with $L_1$ and $L_2$. Connected to power line $L_1$ is a selector switch 100 which will be seen to have an "off" position, an "on" position, and an "inch and traverse" position. When switch 100 is in its "on" position it makes connection with a wire 180 leaving through normally open feed start switch 110 and thence through the coil of a relay 182, the other side of which being connected to power line $L_2$. This relay has a blade 184 which when closed will cause energization of the feed motor 22 which causes feeding of the web of forms or film 10 through the reading station in the manner already described.

Relay 182 has the blade 129 mentioned above which is open when the relay is energized. Thus, no power is supplied to the detector channel when the motor 22 runs. A third blade 186 of the relay 182 is in the holding circuit thereof which also passes through a stop switch 112 and the normally closed limit switch LS1 which is opened by the cam wheel 46 (FIG. 2).

It will be evident that closing of switch 100 will bring about energization of feed motor 22 to advance the film 10 and that this advance will continue until switch LS1 is opened by a cam whereupon the feed movement will stop and at that time a reading out operation will take place.

When limit switch LS1 is activated by one of the cams it closes a blade 188 which establishes a circuit through the coil of a relay 190, the other side of the coil being connected with power line $L_2$. When this relay closes, it opens a blade 192 in circuit with relay 182 so that this relay cannot again be energized until the relay 190 is again de-energized.

Energization of relay 190 also closes blades 194a through 194e thereof. Each of blades 194a through 194e are connected with one of the drive motors 90a through 90e pertaining to the several turrets 41, 42, 43, 44 and 45 of the reading station. These turrets thus commence to index in accordance with the geneva drive located between the indexing motors and the turret as illustrated in FIGURES 2 and 3. As these turrets index for a reading operation, and if the dots or their images in the column pertaining to the turret are those for which all the selector switches such as 122 (FIGURE 5) are set, the pertaining read-out relay 158 will close. Whenever the read-out relay pertaining to any one of the turrets closes, it opens the associated one of a blade 197a through 197e which are in circuit with the pertaining turret motor so that the turret motor will come to a halt.

A second blade 196a through 196e is closed by energization of the pertaining relay 158a to 158e.

At this point it will be evident that upon closing of all of the read-out relays 158a through 158e, all of the turret motors will come to a halt and in addition a master read-out relay 198 will be energized. Apparently this occurs only upon complete coincidence of the color combination set by selector switch 122 and the observed color combination. When this relay 198 is energized, a holding circuit therefor is established by the closing of a blade 200 thereof; a second blade 202 closes to energize a signal mechanism 204 which may be a light or audible signal or a combination thereof or, alternatively or additionally there may be provided an identifying device marking the particular film portion at which read-out or coincidence occurred. There is also a blade 206 opened by closing of relay 198 which is in circuit with relay 182 so that this relay cannot again be energized in case of a coincidence or read-out.

Another blade 194f pertaining to relay 190 closes upon energization of the relay to illuminate the light 208 which indicates that a reading operation is in progress.

Still another blade 194g associated with relay 190 closes when this relay is energized and establishes a circuit to a time delay switch 210 which remains open for a period of time sufficient to enable all of the turrets of the reading station to complete one revolution.

If there is no complete read-out (no coincidence) not resulting in closing of all of relays 158a through 158e within that period of time, switch 210 will close its blade 212 which will energize a relay 214 having a normally closed blade 216 in circuit with relay 190 so that this relay will drop out and having a normally open blade 218 by-passing switch 110 so that a new feed cycle will commence with motor 22 being energized and resulting in a reading out cycle when switch LS1 is again actuated.

Relay 198 also has a blade 220 thereon, in circuit with relay 190, so that energization of relay 198 will result in de-energizing of relay 190 and the halting of the turret motors.

It will thus be seen that the feeding of the film being scanned by the reader will take place continuously on an intermittent basis unless there is a complete reading out in which case the feeding will come to a halt and a signal will be energized. Restarting is only possible thereafter if the holding circuit for relay 198 is interrupted.

The blade 129a (FIGURE 5) governing the current supply to the individual dot probing device or detector channel may also be controlled by relay 182, inasmuch as the energization of each dot detector channel need only be possible when the feed motor stops.

It will at times be desirable to cause rapid traverse movement of the film 10 being scanned in either the forward or reverse direction, there will also be occasions when it is desired to inch the material to the reading station for one reason or another.

This is accomplished by setting switch 100 in its third position wherein it makes connection with a wire 222. This wire is connected through a normally open switch 224 and a normally closed switch 226 with an inch motor 228 connected to the shaft of motor 22. It will be apparent that closing of switch 224 will energize the inch motor and this will cause movement of the material being read only so long as the switch 224 is kept closed.

For traversing the film 10 rapidly either in the forward or reverse direction the switch 226 is depressed which interrupts the circuit to inch motor 228 and instead closes a circuit to a wire 230 leading to the blade of selector switch 104 which can be adjusted in one position to cause forward rotation of the high speed traverse motor 232 and into another position to cause reverse rotation thereon. The film 10 can thus be rapidly traversed either for wind-up operations or to move it rapidly to a predetermined region therealong for a reading operation.

FIGURES 7, 8 and 8a illustrate another embodiment of the present invention.

There is shown again a film strip 310 carrying color dot patterns successively arranged in equi-spaced areas, in a similar manner explained with reference to film 10 in FIGURE 1. However, for the purposes of this embodiment it is assumed that there are provided six lines and six columns; therefore altogether thirty-six dots define each pattern. The feeding mechanism for film 310 and the overall structural arrangement thereof in this embodiment has been simplified and only the scanning mechanism is illustrated specifically; however it is apparent that the feeding mechanism for film 10 and structure thereof can be similar as explained with reference to FIGURES 2, 3 and 4.

There is provided a flat, hollow rail guide 311 through which film 310 is run, and this rail guide 311 has a window 312 illuminated by the radiation of a bright light source 313.

The film 310 is advanced by a motor 314 which is geared to sprocket type wheel 315 engaging perforations 316 of the film 310 whereby film 310 is advanced in a manner similar to the transport of the film in a movie camera. Film 310 is assumed to be transparent, and therefore the light of the light source 313 will pass therethrough; the passing light is modified at definite locations by the colored dots thereon. In this instance, the term "color dot" has to be defined more precisely. The transparency of the film 310 at the place of such dot is modified to such an extent that the light passing therethrough is filtered color-selectively. The color of the dots in this instance is to be understood as referring to the light which is permitted to pass through a dot. Thus, the dots on the film define a plurality of color selected filters of high accuracy and it is apparent that the frequency characteristics of the light passing through has to be defined very accurately indeed, in order to have the device operating properly within the scope desired. The light source 313 has to also be very accurately defined in that the light spectrum thereof is very accurately known.

On the other side of the window 312 is provided a divergent light collimator 320 having altogether thirty-six divergent light channels, each channel being enclosed by mirrors. The light source 313 preferably is a point one or defines virtually an accurately pointed origin, whereby this point coincides with the apex of the collimator 320. The thus collimated light defining altogether thirty-six separated beams impinges upon a screen 321 which is provided with a suitable frame 322, defining four screen areas. This screen can be made of frosted glass, having inserted or attached a plurality of photocells.

Each one of the thirty-six beams produces an illuminated square on the screen, which is of course slightly deformed in view of the fact that the screen 321 is not of spherical configuration but planar. However, the screen preferably is positioned at a considerable distance from the light source, and there will be only little distortion which is actually unimportant and can be neglected.

Within each of these rectangles there will appear the reproduction or image of one colored dot. At this point it has to be mentioned that for a monitoring process of the dots of course the light having passed through each of the colored dots must pass through one of the channels of collimator 320, and therefore the colored dots are reproduced on screen 321 in a separated and spatial relationship.

The relative distance between the film 310 and the screen 321 is selected so that the image of one dot covers one quadruple of photocells such as denoted with the reference numerals 331, 332, 333 and 334, as example. For purposes of illustration, a part of the screen has been cut off to illustrate the arrangement of the photocells. There are altogether 36 times 24 photocells, positioned in a separated relationship. One will select the screen so large that this relatively large number of photocells can be placed properly so that it is not necessary to employ special small sized photocells, so that one can use those of usual size.

It is the special characteristic of this embodiment of the invention that three of the photocells of each quadruple are selectively color sensitive. In particular, one of them is preferably red sensitive; one is blue sensitive; one is yellow sensitive; the fourth photocell is not color selectively sensitive but being sensitive to the overall brightness. All four photocells are one detector group monitoring the color of the image of one dot.

It will be appreciated that the device thus shown permits the observation of dots which are relatively small on the film 310. In particular, this film 310 may be a usual 8 mm. small camera film; thus, on the usual small size roll there is space for a very large number of information patterns. Also, marketable color sensitive film is particularly suitable for this purpose in view of the high quality of this film presently on the market.

The dots on the film can be very much enlarged, and a linear enlargement of, for example 10,000 is quite possible and does not present any difficulty.

Passively running the film 310 is a sprocket type wheel 323 rotating on a common shaft with a cam wheel 324 operating a switch 325. The specific function of this switch will be described with reference to FIGURE 8; at the present it is sufficient to note that a cam of wheel 324 closes the switch 325 to stop advancement of the film whenever a complete pattern appears in window 312 so that after stopping of film 310 the dot images on screen 321 cover precisely their virtually associated quadrule of photocells.

Turning now to the electric circuit of the dot image monitoring device, particularly the color detectors thereof employed in this instance, a suitable network is illustrated in FIGURES 8 and 8a. It shall be mentioned first that the circuit of FIGURE 8a is the monitor device including the photoelectric detector circuit for the image of one dot including a group of four photocells. There are altogether employed thirty-six of such networks, each one defining a detector channel. In other words, for the scanning station observing the screen 321 there will be thirty-six of these detector channels, each of them including the elements illustrated in FIGURE 8a. All these thirty-six detector channels, one of which being illustrated in FIGURE 8a, shall hereinafter be called the detector circuit.

Turning now to this particular example shown in FIGURE 8a, there are first shown again the four photocells 331 to 334 which were already mentioned, color probing the dot image in the upper left hand corner of screen 321. The electrical outputs of each of these photocells are fed to electronic amplifiers of conventional type, indicated by the blocks 341, 342, 343, and 344. The output of each of the amplifiers energizes the coil of a relay, respectively, and there are provided altogether four relays denoted with reference numerals 351, 352, 353, and 354 connected to and controlled by amplifiers 341 to 344, respectively. Each one of the three relays 351, 352 and 353 has three blades identified by postscripted -a, -b, and -c.

For example, the photocell 331 is sensitive to red, the photocell 332 is sensitive to yellow and the photocell 333 is sensitive to blue, while the photocell 334 is sensitive to overall brightness or white and is of the ordinary, non-color selective type.

There is furthermore provided a selector switch 360 having altogether seven stationary contact terminals 361, 362, 363, 364, 365, 366 and 367. These terminals are circularly arranged, and they may selectively be scanned by a glider arm 368 having a central terminal 369 to which leads a conductor line 370 feeding in turn a relay coil $C_1$.

The terminals 361 to 367 cooperate with the blades of relays 351, 352 and 353 in a manner which will be described later. The relay 354 operates only upon one blade which is denoted with 354a and which is inserted in a line 371 to be connected by this blade 354a to a positively biased power line 381.

The other side of relay coil $C_1$ is connected by means of a line 381, to a negative terminal L2 of this voltage source, the positive terminal of which was referred to above.

Only when blade 354a is closed, the closing of any of the blades actuated by relays 351, 352 and 353 can become effective.

Blades 351b and 352b, blades 351c and 353b, blades 352c and 353c define series circiuts, respectively;

Blade 351a may interconnect line 371 and terminal 361 of selector switch 360;

Blade 352 may interconnect line 371 and terminal 362;

Blade 353a may interconnect line 371 and terminal 363;

Blade 351b and blade 352b may interconnect line 371 and terminal 364 of the selector switch 360;

Blade 351c of relay 351 is connected to line 371, and the blade 351c completes a series circuit connection with blade 353b to terminal 365;

Finally, the blade 352c of relay 352 may be connected directly to line 371 and, together with blade 353c forms a series circuit to terminal 366 of selector switch 360.

The last one of the terminals 367 of selector switch 360 is connected directly to line 371. This gives the relationship between the output circuit, i.e., the blades of the relays and the selector switch 360.

It will be recalled that the group of four photocells 331 to 334 observe the image of one dot. Suppose this dot is a red one as defined above, then photocell 331 will be energized but not photocells 332 and 333, and only the relay 351 closes its blades. Simultaneously, of course, the color insensitive photocell 334 has been energized and the relay 354 has closed blade 354a so that in fact line 371 is connected to the operating voltage. Relays 352 and 353 will not be energized because the associated photocells have not been energized for relay operation.

There are now three possibilities; first, the glider 368 of selector switch 360 is set to a position so as to contact terminal 361. Upon closing of blade 351a, current will flow therethrough and through relay $C_1$ for energization thereof.

The second possibility is that the glider arm 368 contacts terminal 367. In this case, relay $C_1$ is energized when contact plate 354a closes irrespective of the energization of photocell 331 and the closing of the relay 351.

Third, if the glider arm 368 is in any other position, relay $C_1$ will remain unenergized.

It will be recalled that in the instant case, it was assumed that the dot may have one of the six colors, red, orange, yellow, blue, green, and violet-purple. Suppose the dot is violet-purple, in this case photocells 331 (red) and 333 (blue) will be energized. Of course, also photocell 334, as always will be energized, but photocell 332 will not be energized. Upon such energization, relays 354, 353 and 351 will close. Again, the line 371 obtains a positive voltage and the blades of relay 351 and 353 swing into the operation position.

Again three cases have to be distinguished:

(1) If the glider arm 368 contacts terminal 365, a current path is defined from line 371 through blade 351c, blade 353b, terminal 365, glider 368, line 370, relay $C_1$ to line 381 and the negative terminal L2. Thus, in this case the relay $C_1$ will be energized.

(2) Glider arm 368 contacts terminal 367 and in this case relay $C_1$ will be energized irrespective of the energization of any of the color sensitive photocells.

(3) The glider arm 368 contacts any of one of the other terminals of selector switch 360, and the relay $C_1$ will remain unenergized.

It can readily be derived from the drawing and the description given above what happens if the dot has any of the other colors; considering only photocells 331, 332 and 333; if for example in case the dot is yellow, only relay 332 is energized; in case the dot is orange, only photocells 331 and 332 will be energized; if the dot is green photocells 332 and 333 will be energized; if the dot is blue only photocell 333 will be energized. It will be apparent that everyone of the terminals 361 to 366 of selector switch 360 is associated with one particular color, while terminal 367 represents simply "light." The relay $C_1$ will be energized only if the arm 368 of selector switch 360 contacts the terminals of the associated color if the dot observed by the group of photocells has in fact this color. Otherwise relay $C_1$ will be energized only if the selector switch, i.e., the arm 368 of selector switch was adjusted so as to contact terminal 367.

The purpose of selector switch 360 will be apparent; if the arm 368 contacts any of the terminals 361 to 366 it means that relay $C_1$ is to be energized only if the dot has the color associated with each of these terminals, otherwise not. If the contact arm 368 contacts terminal 367, then relay $C_1$ is to be energized irrespective of the color of the dot, or, in other words, the relay $C_1$ shall be energized during every monitoring process.

Turning now to FIGURE 8, the read-out apparatus as a whole will become more apparent therefrom.

There is again the positive line terminal L1 and the negative line terminal L2 whereby primary input switch 400 serves to connect the entire circuitry to the power supply, thus defining a positive terminal line 401. There is provided first a starting switch of the push button-releasable type, 402. This starter switch controls the current to the primary starter relay 403, having a holding blade 404 and an operating blade 405 which is to control the power supply to the transporting motor 314 (see also FIG. 7). The contact blades 406 and 407 pertain to relays which will be explained later, and they are normally closed. Therefore, upon closing of starter button switch 402, relay 403 will be energized and closing its holding blade 404 as well as the control blade 405 for the motor 314 which thus advances film 31 across the window 312 in FIGURE 7.

As it was also explained in connection with FIGURE 7, there is provided a cam control (wheel 324) for a switch 325, this cam control switch 325 is to open blade 406 when one complete pattern is "visible" in the window 312 and projected properly upon the screen 321 as outlined above.

In case the blade 406 opens, the holding circuit for the relay 403 is interrupted and therefore it opens and stops current supply for feeder motor 314.

It will be appreciated that the stopping action may be initiated slightly before the pattern is in its proper position in order to allow for a certain slippage and delay between the initiation of stopping of motor 314 and the actual stop thereof as well as of film 310.

Blade 406 is ganged to another blade 408, which closes upon stopping of the film 310 whereby a relay 409 becomes energized, closing its blades 410 and 411. The blade 410 is in series circuit connection with the line 381 which pertains to the electric power supply for the photocells, and all the selector devices such as shown in FIGURE 8a; this was called the detector circuit. Thus, only upon closing action of relay 409, the dot pattern as projected upon screen 321 (FIG. 7) is probed and only then the thirty-six detector channels of the type as outlined in FIGURE 8a can become energized.

The complete detector circuit includes thirty-six selector switches of the type 360 as illustrated in FIG. 8a and also thirty-six relays of the type $C_1$, also as illustrated in FIG. 8a; their current supply is governed by blade 410. The adjustment of all of these selector switches represents a predetermined color combination for the dots as stated above. It will be apparent from the foregoing description that whenever a dot as reproduced upon the screen 321 has the color as adjusted with the virtually associated selector switch for this particular area upon which the dot is projected, the associated relays such as $C_1$ will close.

There are altogether thirty-six relays of this type and their blades are all shown in FIG. 8 and denoted with reference numerals $c_1$ to $c_{36}$. These relays form the output of the thirty-six detector channels.

Upon complete coincidence, all of the blades through $c_{36}$ will close, and a coincidence relay 412 will be energized thus opening its associated blade 413, also placed in line 381, for the control of the power supply to the detector circuit, which thereby becomes interrupted and all of the blades $c_1$ to $c_{36}$ open; but coincidence relay 412 has a holding blade 414 and thus remains closed. Simultaneously, a third blade 407 of relay 412 is opened, forbidding a restarting of the feeder motor 314; all this happens in case of an observed coincidence or a complete read-out.

Relay 412 is kept in its energized position by hloding contact 414 which is controlled by an interruptor switch 415 in case one wishes to restart the probing process. Upon interrupting switch 415 momentarily, relay 412 will become de-energized thus closing the blades 407 and 413. It might be desirable to mechanically couple or gang the starter switch 402 and the interruptor switch 415, so that upon de-energizing of relay 412 with simultaneous reconnecting of the power supply of the detector circuit and power 381 line, the motor 314 is immediately started again in that upon the temporary closing of starter switch 402, relay 403 becomes energized again. Simultaneously, with restarting of the feed motor, limit switch 406 closes again until the next pattern appears in window 312 and is reproduced on screen 321, whereby another cam on wheel 324 (FIG. 7) causes blade 406 to open again. Again, motor 314 comes to a complete stop, relay 409 is energized because blade 408 is closed again; thus the power supply for the detector circuit is energized again when blade 410 closes. Relay 409 also closes the blade 411 when energized, and current is fed to a delay network 416 of any kind, which thus starts to run.

Suppose this next pattern just under monitoring process does not produce a complete coincidence, and therefore not all of the blades $c_1$ to $c_{36}$ close, then coincidence relay 412 remains unenergized. After a predetermined period of time, the delay 416 closes its blade 417 thus energizing relay 418. Upon energization of relay 418, its blade 419 is opened and the power supply for the detector circuit is interrupted.

There is another blade pertaining to relay 418 which is denoted with reference numeral 420 defining an auxiliary supply circuit for the starter relay 403. Upon closing of the blade 420 (blade 407 having remained closed), the starter relay 403 will close again, thereby closing blade 405, and feeder motor 314 will start to run. Immediately after starting blade 408 opens, relay 409 is de-energized and the detector circuit as well as the delay device 416 are also de-energized. The corresponding opening of blade 420 does not stop the motor because the holding circuit of relay 403 is closed over now closed blade 406.

It will be apparent from the foregoing that the probing of the information content of the film 310 is continued automatically until again a complete read-out, i.e., coincidence with a predetermined color pattern as adjusted by all the selector switches associated to the photocell bank of the detector circuit is produced; then the mechanism comes to a complete stop to be restarted again by switch 415.

There can be, of course, inserted also an indicator lamp for this particular case as outline in connection with FIGURES 5 and 6.

Turning now to FIGURE 9, there is illustrated another embodiment of the present invention which can be considered as a combination of the two embodiments described above.

There is provided an observation station for a film 510; there is a guiding rail structure 511, having a window 512 upon which shines light source 513 having a well-known frequency or color distribution. There is furthermore provided, on the opposite side of the window, a television camera of the tri-color type, 514, feeding three separated color signals into separated transmission channels 515, 516 and 517. There is provided a control circuit 518 for a tri-color television picture tube 519, reproducing the dots in an enlarged scale on its screen 520.

Elements 511 to 520 correspond to the TV pick-up reproduction circuit outlined in connection with FIGURE 2.

Adjacent the video screen 520 of the television picture tube are positioned banks of photocells, disposed thereon in quadruples, in a manner similar as outlined in connection with FIGURE 7. These photocells are shown schematically as being positioned on a panel 521 or the like. Altogether thirty-six quadruples of photocells are used, each quadruple being one group such as 522. These photocells observe the color dots reproduced on the video screen whereby four photocells observe the image of one dot and the output of the photocells is fed to a detector channel and then to a coincidence circuit which all may be precisely the same outline in connection with FIGURE 8 and FIGURE 8a, and these figures and the description thereof are to be considered to also pertain to this embodiment.

FIGURES 10 to 13 illustrate another embodiment of the present invention. In FIGURE 10 there is provided a table 601 over which runs a film 610 carrying color dot patterns as shown in FIGURE 1. There is provided a single light source 611; there is a window 612 in the table 601. The light beam from light source 611 is collected by a numeral 611' and directed towards the window thus passing through the film 610 as a cylindrical beam. There is furthermore provided a pair of crossed and interlaced, semi-transparent mirrors 613 and 614, which mirrors are not color selective but dividing the light coming through window 612 into altogether three beams. The first one of the beams is directed towards a mirror 617, the second one of the beams is directed towards a mirror 615, and the final beam is permitted to directly pass through these mirrors. Each of these beams represents a complete picture of the entire area of film 610 visible through window 612.

It may be assumed that there are altogether twenty-five dots in each pattern, thus there will be five columns and five lines (see FIG. 1). One row or column of these dots will be probed via one turret with an associated bank of five photocells. The structure shown is so that only one or two columns of each of these three picture-beams are probed. Only two columns, for example the first and the fourth column, of the color dot pattern image coming from mirror 615 is probed. These columns, one and four, will be observed by turrets 621 and 624 as shown in FIGURE 11 to be taken in connection with FIGURE 10.

It will be apparent that in this case these two turrets can be sufficiently spaced from each other thus permitting the provision of ample space for the driving gear. The second and fifth columns of each image pattern will be observed by turrets 622 and 625 which are placed in the position of the rays reflected by the mirror 617. Finally, there is a fifth turret 623 observing the third column only the light thereof having passed through mirrors 613 and 614.

Each of the turrets has six different circumferentially disposed color filters and is driven via a Geneva drive by a separated turret motor in a manner outlined in connection with FIGURES 2 and 3. It will be appreciated that each turret has disposed inside thereof a bank of five photocells observing all dots of their respective column. A coincidence network is provided of the same kind as described in connection with and illustrated in FIGURES 5 and 6, i.e., these figures and their description are to be considered to also pertain to this embodiment.

It will be understood that this invention is susceptible to modification in order to adapt it to different usages and conditions and accordingly it is desired to comprehend said modifications within this invention as may fall within the scope of the following claims.

What is claimed is:

1. An arrangement for reading out information symbolically recorded within a surface area on a carrier, said information in said area being defined by a predetermined pattern of spatially separated colored dots, with the color of each dot being selected from a number of preselected colors, comprising: a tri-color television camera observing said area; a television picture tube having a control circuit connected to said camera and reproducing on its video screen said area on an enlarged scale; a plurality of photoelectric cells disposed adjacent said video screen; a plurality of color filters changeably interposable between said cells and said screen; sensing means for the position of said filters; and adjustable electric circuit means connected to said sensing means and said photocells for defining an electric circuit when the adjustment corresponding to a particular filter as sensed by said sensing means and the outputs of said photocells coincide.

2. An arrangement for reading out information symbolically recorded within a surface area on a carrier, said information in said area being defined by a predetermined pattern of spatially separated colored dots, with the color of each dot being selected from a number of preselected colors, comprising: a tri-color television camera observing said area; a television picture tube having a control circuit connected to said camera and reproducing on its video screen said area on an enlarged scale; a plurality of photocells each one defining a detector channel and each one observing the image of one dot on said video screen; color filter means including a plurality of different color filters interposable in the light path between said image and said photocell; a selector switch for each channel; filter position sensing means for each channel; electric circuit means interconnecting said photocell, said selector switch ad said sensing means of one channel, so that an output is produced when a predetermined dot color, a particular filter and a predetermined adjustment of said selector switch coincides; and means for combining all outputs produced by all of said channels.

3. An arrangement as set forth in claim 2, each channel further including selective circuit means so that said output is produced regardless of filter position, adjustment of said selector switch and dot color.

4. An arrangement for reading out information symbolically recorded within a surface area on a carrier, said information in said area being defined by a predetermined pattern of spatially separated colored dots, with the color of each dot being selected from a number of preselected colors, comprising: a tri-color television camera observing said area; a television picture tube having a control circuit connected to said camera and reproducing on its video screen said area on an enlarged scale; a plurality of groups of photocells, each group defining a detector channel for one dot image on said screen, each group including photocells of different color sensitivity; first circuit means for each channel connected to the photocells thereof and producing different outputs at different colors sensed, so that a plurality of outputs is producible corresponding to the plurality of selectable colors; a selector switch for each channel; single-electrical-output-producing means for each selector switch and being connected thereto; second circuit means for each channel interconnecting said first circuit means and said selector switch so as to render said single output producing means responsive to an output of said first circuit means corresponding to a color; and means for combining all the single outputs as produced in all the channels.

5. In an arrangement for reading out information symbolically recorded with an area on the surface of a carrier as a pattern of spatially separated colored dots, with the color of each dot being selected from a number of pre-selected colors, the combination comprising: a television picture tube reproducing on its video screen said area on an enlarged scale, a plurality of color sensitive photoelectric detector channels, each for observing one dot within said patterns and producing an output signal representative of the color of the observed dot; a signal responsive element for each channel; a plurality of individually adjustable selector means, each interconnecting a channel with its associated signal responsive element for selectively permitting passage or suppression of said signal in dependence upon the color it represents; and means for interconnecting all of said signal response elements.

6. In an arrangement for reading out information symbolically recorded within an area on the surface of a carrier as a pattern of spatially separated colored dots, with the color of each dot being selected from a number of pre-selected colors, the combination comprising: a tri-color television camera observing said area means cooperating with said camera for reproducing said area remote from said carrier at an enlarged scale; a plurality of color sensitive photoelectric detector channels, each for observing the reproduction of one dot within said pattern and producing an output signal representative of the color of the observed dot; a signal responsive element for each channel; a plurality of individually adjustable selector means, each interconnecting a channel with its associated signal responsive element for selectively permitting passage or suppression of said signal in dependence upon the color it represents; and means for interconnecting all of said signal response elements.

7. An arrangement for reading out information symbolically recorded within a surface area on a carrier, said information being defined by a predetermined pattern of spatially separated color dots, with the color of each dot being selected from a number of pre-selected colors, comprising: a tri-color television camera observing said area; a television picture tube having a control circuit connected to said camera and reproducing on its video screen said area on an enlarged scale; a plurality of color sensitive photoelectric detector channels, each for observing the reproduction of one dot within said pattern and producing an output signal representative of the color of the observed dot; a signal responsive element for each channel; a plurality of individually adjustable selector means, each interconnecting a channel with its associated signal responsive element for selectively permitting passage or suppression of said signal in dependence upon the color it represents; and means for interconnecting all of said signal response elements.

References Cited in the file of this patent

UNITED STATES PATENTS

| | | |
|---|---|---|
| 1,953,072 | Casper | Apr. 3, 1934 |
| 2,266,779 | Longbridge et al. | Dec. 23, 1941 |
| 2,595,701 | Potter | May 6, 1952 |
| 2,731,200 | Koelsch | Jan. 17, 1956 |
| 2,783,454 | North | Feb. 26, 1957 |
| 2,816,157 | Andreas et al. | Dec. 10, 1957 |
| 2,834,005 | Betchledge | May 6, 1958 |
| 2,888,570 | Toulmin | May 26, 1959 |
| 2,922,987 | Haug | Jan. 26, 1960 |